Patented Dec. 10, 1940

2,224,541

UNITED STATES PATENT OFFICE 2,224,541

LUBRICATING COMPOSITION

Per K. Frolich, Westfield, N. J., assignor to Standard Oil Development Company, a corporation of Delaware No Drawing. Application June 9, 1939,
Serial No. 278,264

12 Claims. (Cl. 252—57)

The present invention relates to the preparation of high grade lubricating oils for use in internal combustion engines and for similar service and, particularly, for use in "breaking in" new engines. My invention will be fully understood from the following description of the oils and their characteristics and methods of manufacture.

In the past there has been an appreciation of the fact that various substances when incorporated into mineral oils increase their oiliness and general value as lubricants, for example, by incerasing their load bearing capacity and by reducing friction, but such information has been very limited and heretofore little, if any attention has been paid to the effect of such compounding agents on different bearing metal combinations. I have found that the bearing metal combination is of the utmost importance in respect to addition agents. For example, I have found that certain addition agents may be of great value for say, steel to steel bearings and, at the same time, to be of great detriment to other combinations, for example, aluminum to steel or to cast iron.

My present invention deals with oils which are to be used in automobile engines or in similar service where a high degree of efficiency must be met with several different bearing metal combinations. In the following description the term bearing includes not only journals but any other cases in which metal surfaces move against one another. A the present time at least two, and generally three, or more different metal combinations are used in practically every internal combustion engine now manufactured, and practical considerations make it absolutely necessary that the same oil be used in all of these different bearings. Furthermore, all of the manufacturers must market an oil which will be satisfactory in the great majority of engines manufactured at the present time. It will be readily understood, therefore, that the oil must have a universal character, that is to say, it must be capable of excellent service in substantially any type of bearing combination to be encountered. For practical purposes it is necessary that the oil give a high average performance when used with the following bearing combinations:

Steel to bronze (wrist pins and bushings)
Steel to aluminum (cylinders and aluminum pistons)
Steel to babbitt (main bearings and crankshaft bearings)
Steel to cast iron (valves)
Cast iron to cast iron (pistons and cylinder walls)
Cast iron to aluminum (pistons and cylinder walls)

The oils to be described below are not only of great value for general lubricating purposes in internal combustion engines and in other instances where similar requirements exist, but they are of particular value in "breaking in" oils. New or "green" engines, just as an example, require careful running for several hundred miles; generally 500 or 1000 miles is considered necessary. The purpose of this is to gradually wear down high spots, tool work and other similar irregularities, and to avoid danger of seizure or bad scoring. My oils are admirably fitted for this service because of the high film strength produced and of the low friction developed, and this is characteristic of all of the types of bearings likely to be met with in actual practice. My oils are also generally satisfactory for upper cylinder lubrication, the highly refined oils being much more suitable for this purpose and the ester blend is then added directly to the gasoline tank just as the unblended oil is now used.

In the following description my oils are described generally as motor oils, but it should be understood that they may be used for many other purposes and particularly as indicated above, where the same oil must be used with several different bearing metal combinations.

In my study of the effect of different addition or compounding agents on different bearing metal combinations, I have found that while a particular agent may give excellent results with respect to some particular bearing combination, it may at the same time be a great detriment in the case of some other. As an example of this I cite the use of chlorine-containing oils, for example mineral oil containing small quantities of carbon tetrachloride, say 2 to 3% or more. Such an oil when used in a bearing combination of steel to steel shows a load bearing capacity of 25,000 pounds and a friction value of 75 to 80 foot pounds as determined on the Mougey machine referred to below. The same oil base without the compounding agent carried a load of only 3,000 pounds and gave a frictional value of 32 foot pounds. Thus, it will be seen that the chlorine compounds, of which carbon tetrachloride may be taken as typical, are extremely good for use with steel to steel bearings, but if a bearing of steel to lead bronze is used the uncompounded mineral oil carried a load of 25,000 pounds and gave a frictional value of 55 as compared with 16,000 and 88 pounds, respectively, for the same oil containing the chlorine compound. From this it will be seen that the straight mineral oil is better than the compounded oil in the case of steel to bronze and comparing both tests it will be noted that the chlorine compounds greatly increased the lubricating value of the oil with respect to steel and steel combinations while it was a substantial detriment in the case of bronze to steel.

I wish to point out at this time that too much attention should not be given to the fact that one type of bearing is capable of standing a far greater load than some other type of bearing. Bearings may always be designed to carry the particular load required. If the addition agent produces higher load bearing capacity the size of the bearing may be greatly decreased which is, of course, an advantage. But the danger in such cases is that an addition agent may be added which will greatly decrease the film strength in respect to some particular bearing below that of even the uncompounded oil so that the bearing surface might be much smaller than would be actually required. In "breaking in" service this becomes of even greater importance since, due to the slight irregularities in manufacture, there are high spots and tool marks in the bearings which consequently carry much greater loads than the bearing was ever designed for.

An improved compounding agent should thus be one which preferably increases the load bearing capacity in all cases, produces the least friction possible, and if this is not possible with all bearings, then it is at least necessary that it should not in any case reduce the load bearing capacity for any particular bearing combination.

Many types of blending agents other than chlorine-containing oils have been suggested such as sulphur-containing oils, soaps, acids such as fatty acids and the like, and I have tried a great many of these but I found that esters are far the most desirable agents, that they are equal in almost every case to the best results obtained with any other compounding agent on any particular bearing, while at the same time in no observed case did they prove to be a detriment in respect to load bearing capacity, or otherwise.

The esters which I used are in general those having a boiling point above 150° C. (302° F.) and preferably above 180 or 200° C. These esters are preferably normally liquid, although solid ones may be used in small amounts. For the preparation of these esters, the cyclic acids such as the aromatic and naphthenic acids, even the di- or poly-basic acids, are used. For example, I may use naphthenic acids such as are obtained from the Gulf Coast, or Russia, or Rumanian crude oils, and aromatic acids such as benzoic and salicyclic are also useful. These naphthenic acids may also be extracted from petroleum fractions, such as solvent extracts, distillates, and lubricating oil stocks. They are preferably purified of any tarry and asphaltic matter which they may contain, and of any inorganic acids or derivatives thereof that may be present as a result of prior refining of the oil containing the naphthenic acids. While the naphthenic acids may be halogenated and/or sulfurized to introduce one or more halogen atoms, such as chlorine, and sulfur, into the molecule, the naphthenic acids consisting substantially of carbon, hydrogen and oxygen are preferred.

As to the alcoholic group used for preparing the esters, the aliphatic alcohols are generally to be preferred not only because of their cheapness and availability but also because their esters are generally better colored and more stable. Ethyl and methyl alcohols are suitable when combined with the naphthenic acids obtained from petroleum so as to have boiling points above 150° C. as indicated above. Normal propyl or isopropyl alcoholic esters are also useful when combined with the cyclic acids producing esters of the proper boiling point, while alcohols such as normal butyl or secondary butyl or the amyl alcohols may also be used.

Dibasic alcohols, the glycols, can also be combined with the cyclic acids and make valuable addition products. Similarly, the glycerol esters may be used, but they as well as the glycols should be produced synthetically so as to avoid the presence of non-fats, resins, albuminoids, and the like which naturally occur in all products of vegetable and animal origin. I recognize the fact that natural fats and fatty oils have been used before as compounding agents but these materials, as indicated above, are always contaminated to a slight extent with impurities naturally contained in the animal or vegetable bodies from which they are derived, and these impurities even in small amount prove undesirable in lubricating oils, since these cause sludging and, for reasons little understood although probably connected with the stability of the oil, do not give wholly satisfactory motor operation. Furthermore, natural fats and fatty oils cause a darkening in color and possess poor oxidation characteristics which are not found in the synthetically produced substances and which are undesirable for the highly refined, non-sludging oils now in demand. Suitable esters for use in this invention may also be formed by combining the cyclic acids with aralkyl alcohols such as benzyl alcohol or with phenol or other hydroxy aromatic compounds such as creosol, toluol, butyl phenol, resorcinol, hydroquinine, naphthol and the like which may contain other groups also attached to the aromatic ring, such as alkyl, oxy, nitro, amino or sulfur-containing groups.

It should be understood that I have a distinct preference for mono-alcoholic esters preferably esters of saturated aliphatic alcohols and the naphthenic acids of petroleum and if the glycol or glyceryl esters are to be used they should be produced synthetically. These esters are preferably those containing only the elements carbon, hydrogen and oxygen although esters containing other elements may be used, such as those containing nitrogen, nitro, amino, sulfur or sulfur-containing groups. The esters may be produced synthetically by any particular method. The usual method of esterification using acids and alcohols may be used but other methods in which, for example, acid chlorides are used are satisfactory, and any other suitable synthetic method may be used since in all of these cases the presence of the impurities naturally occurring in fats and vegetable products is avoided.

Some of these esters are difficultly soluble in mineral oil but usually they can be brought into solution by addition of stabilizing agents for examples by mixing with another and more soluble ester, oil, or the like.

For purposes of general motor lubrication the esters may be used in relatively large amounts, say up to 10 or 15% or even higher, but much smaller amounts are actually required and I have found that extremely good results are obtained with as little as 1%. In general for ordinary lubricating purposes ¼ to 2% or 2½% may be used and an excess over this amount generally does not produce correspondingly increased film strengths. The oils used are preferably well-refined, mineral oils of viscosity from about 45 sec. at 100° F. to 150 seconds Saybolt at 210° F. The actual amount of the ester used must to some degree be determined by the particular service required and the grade of oil used, but the optimum amount can be readily determined by experiment. Oils heavier than 150 seconds Saybolt may be used in some instances although generally not for internal combustion engine lubrication.

For special "breaking in" service I prefer to use a base oil somewhat lighter and less viscous than the ordinary lubricating oils for general service and, furthermore, I prefer to include a slightly greater quantity of the ester, for example, 2 to 4% or 5½% is satisfactory in an oil having say 45 to 60 or 80 seconds Saybolt at 210° F. for "breaking in" ordinary automobile engines. Where truck or other heavy engines are used I would recommend a somewhat heavier oil say having a viscosity of 60 to 70 or perhaps 100 seconds Saybolt at 210° F.

The following tests and examples will further indicate the composition and general characteristics of my oils:

*Mougey tests*

The following tests were carried out under strictly comparative conditions on the Mougey machine. For a description of this machine and the method of testing, see National Petroleum News, November 11, 1931, page 47,, Mougey and Allman. A mineral oil of the following composition was selected as the base.

Gravity_____27.7 A. P. I.
Flash_____410° F.
Fire_____475° F.
Viscosity at 210° F._____50 seconds Saybolt
Viscosity at 100° F._____288 seconds Saybolt When this oil was tested on the Mougey machine using different metal combinations it showed up well in the cases of steel to lead bronze, cast iron to cast iron, but it did not prove entirely successful in the case of steel to aluminum or cast iron to aluminum or steel to steel. When 2% of carbon tetrachloride was added to the oil it was entirely unsatisfactory in the case of steel to bronze bearings and cast iron to cast iron. The same base oil with say 2% of oleic acid (which may be taken as typical of the organic acids) gave good results in most cases but the results were far inferior to the straight mineral oil in the case of steel to bronze, in that much greater friction was developed at all loads and the difference was much more pronounced at higher loads. For example, at a load of 2000 pounds the friction was about twice as great in the case of the acid blend as in the case of unblended mineral oil.

A sulfur compound produced by cooking sulfur with paraffin wax and dispersing about 2% of the mixture in the base oil used above was suitable in bearing combinations of steel or cast iron to aluminum, but signally failed in the case of steel to bronze, and cast iron to cast iron.

Sperm oil, or lard, or fish oil and other animal or vegetable blends gave close results in all cases and they were substantially better than the straight mineral oil in practically all cases.

To compare with the above oils a blend was made up with the same lubricating oil and, with 2% of an ester produced by the reaction of isopropyl alcohol and a mixture of naphthenic acids obtained from petroleum. This mixture of isopropyl naphthenates had a gravity of 19.4° A. P. I., a viscosity Saybolt of 139.4 seconds at 100° F. and 40.1 seconds at 210° F. and a viscosity index of 33.5. This lubricating oil blend gives excellent results with all bearing combinations indicated above. In every case it is substantially equal to the best of all of the other blends. In other words, it gave a high average efficiency of operation in all cases tried.

To further illustrate the types of oil herein contemplated, the following examples are submitted:

*I*

Hydrocarbon oil..26.3° A. P. I.
Viscosity_____86.8 seconds Saybolt at 210° F.
Flash_____510° F.
Pour_____15° F.

containing 1½% of secondary butyl naphthenate. The naphthenate was prepared from naphthenic acid obtained from a Russian gas oil.

*II*

For "breaking in" service an oil 50 to 60 seconds Saybolt at 210° is used containing 4% of isopropyl esters referred to in Example I.

*III*

Oil similar to that referred to in Example I containing 2% of isopropyl benzoate (boiling point 229° C.).

*IV*

As an oil suitable for upper cylinder lubrication a highly refined hydrocarbon oil of the following characteristics is selected and to it is added about 2% of the isopropyl ester of petroleum naphthenic acids. This oil can then be added to the gasoline tank in proportion of say 1 quart to about 10 gallons of gasoline.

Gravity_____31 to 33° A. P. I.
Viscosity at 100° F____30 to 35 seconds Saybolt

In the above examples only a single blending agent is shown in connection with a straight mineral oil, but it will be understood that a mixture of esters may be readily used, or my esters may be used in combination with other substances such as the soaps of lime, soda, lead or other heavy metals, or they may be used in connection with a small excess of acids or the like. The lubricating oils used may also contain oxidation and corrosion inhibitors, sludge dispersers, pour point depressors, thickeners, viscosity improving agents and other blending agents suitable for increasing the quality and stability of the oil. Suitable inhibitors include oil soluble organic sulfides, phenols and amines, particularly the alkyl phenol thioethers and disulfides, such as tertiary butyl phenol thioether, tertiary amyl phenol disulfide, and the amines of more than six carbon atoms per molecule, such as toluidine, xylidine and benzidine. My ester blends are extremely stable, show little or no tendency to be lost by evaporation from the engine even though it may be run at exceptionally high temperatures. There appears to be a tendency for the amount of ester to gradually approach a certain end-value and if an excess is added it is gradually dissipated. It would be desirable to add this ester in the end concentration but this varies with different oils at different temperatures so that it is best to merely add the slight excess and allow the particular end-value to be reached as proper for the particular set of conditions. The esters described herein may be added to lubricating oils for use in automobile engines or to steam cylinder oils, various industrial lubricants and the like, or they may be included as ingredients in grease compositions such as are adapted for use where a higher degree of oiliness is required than is ordinarily afforded by the common greases now available. Under use the ester does not give rise to free acid in detectable amounts and in fact produces no greater amounts of acid than straight mineral oil used under comparable conditions.

This application is a continuation-in-part of copending application Serial No. 600,828, filed March 23, 1932.

This invention is not to be limited by any theory of the mechanism by which these compounding agents increase film strength or decrease frictional resistance, nor to any particular synthetic ester or oil, nor to any particular amount, as it is intended to claim all novelty inherent in this invention in the following claims:

I claim:

1. An improved lubricating oil comprising a viscous hydrocarbon oil containing a small amount sufficient to increase materially the film strength of said oil of a synthetically prepared ester having a boiling point above 150° C. of a cyclic acid and of an alcohol having not more than 3 hydroxyl groups.

2. Composition according to claim 1 in which said ester is produced from a low molecular weight monohydric alcohol.

3. Composition according to claim 1 in which said ester is produced from an isopropyl alcohol.

4. Composition according to claim 1 in which said acid is a naphthenic acid.

5. An improved lubricating oil comprising a viscous hydrocarbon oil and from 0.1 to 5.5% of a synthetically prepared ester having a boiling point above 150° C. of a mixture of naphthenic acids of petroleum origin and of an alcohol having not more than 3 hydroxyl groups.

6. An improved lubricating oil comprising a viscous hydrocarbon and from 0.1 to 5.5% of a synthetically prepared ester having a boiling point above 150° C. produced from a low molecular weight monohydric alcohol and a mixture of naphthenic acids of petroleum origin.

7. An improved lubricating oil comprising a viscous hydrocarbon oil containing a small amount of a synthetically prepared isopropyl ester having a boiling point above 150° C. of a mixture of naphthenic acids of the type found in petroleum.

8. An improved lubricant for automotive engines comprising a viscous hydrocarbon oil containing from 0.1 to 5.5 of an ester prepared synthetically from a monohydric alcohol and a mono-basic cyclic acid, said ester containing only the elements carbon, hydrogen and oxygen, being free from acids and aldehydes, and having a boiling point above 150° C.

9. An improved lubricating oil for internal combustion engines, comprising a viscous hydrocarbon oil having a viscosity of about 45 to 150 seconds Saybolt at 210° F., and containing about 0.1 to 2.5% of isopropyl ester prepared synthetically from naphthenic acid separated from a petroleum oil, said ester being free from acid and sludging constituents and having a boiling point above about 150° C.

10. An improved lubricating oil particularly adapted for breaking in new internal combustion engines, which comprises a mineral oil having a viscosity of about 50 to 60 seconds Saybolt at 210° F., containing from about 2 to 5.5% of an isopropyl ester of naphthenic acid separated from a petroleum oil, said ester being free from acid and sludging constituents and having a boiling point above about 150° C.

11. An improved lubricating oil comprising a viscous hydrocarbon oil containing a small amount, sufficient to increase materially the film strength of said oil, of a synthetically prepared ester having a boiling point above 150° C. of a cyclic acid and of an alcohol having less than 10 carbon atoms and not more than 3 hydroxyl groups per molecule.

12. An improved lubricating oil comprising a viscous hydrocarbon oil containing a small amount of a synthetically prepared ester having a boiling point above 150° C. of a mixture of naphthenic acids of the type found in petroleum and of an alcohol of not more than 3 carbon atoms.

PER K. FROLICH.